United States Patent [19]
Yatsushiro et al.

[11] 4,383,234
[45] May 10, 1983

[54] MAGNETIC LATCH VALVE

[75] Inventors: Kenji Yatsushiro; Mikhail Godkin, both of Chicago, Ill.

[73] Assignee: The Singer Company, Stamford, Conn.

[21] Appl. No.: 311,200

[22] Filed: Oct. 14, 1981

[51] Int. Cl.³ ............................................. H01F 7/08
[52] U.S. Cl. .................................. 335/253; 335/230; 335/234; 335/255
[58] Field of Search ............. 335/229, 230, 234, 253, 335/254, 255, 260, 266, 268, 233; 361/147; 251/65, 66, 68

[56] References Cited
U.S. PATENT DOCUMENTS
3,683,239  8/1972  Sturman ............................. 335/234
4,178,573 12/1979  Swanson ............................ 335/255

Primary Examiner—Harold Broome
Attorney, Agent, or Firm—David L. Davis; Robert E. Smith; Edward L. Bell

[57] ABSTRACT

The permanent magnet is mounted within the coil in engagement with the magnetic frame so when the coil is energized by a pulse of DC voltage of polarity giving a coil flux aiding the magnet the plunger is actuated against the bias of the spring to move the plunger close enough to the magnet to be retained. A pluse of opposite polarity gives a coil flux opposing the magnet flux so the holding force is less than the spring force and the plunger is moved to its inactive position.

1 Claim, 2 Drawing Figures

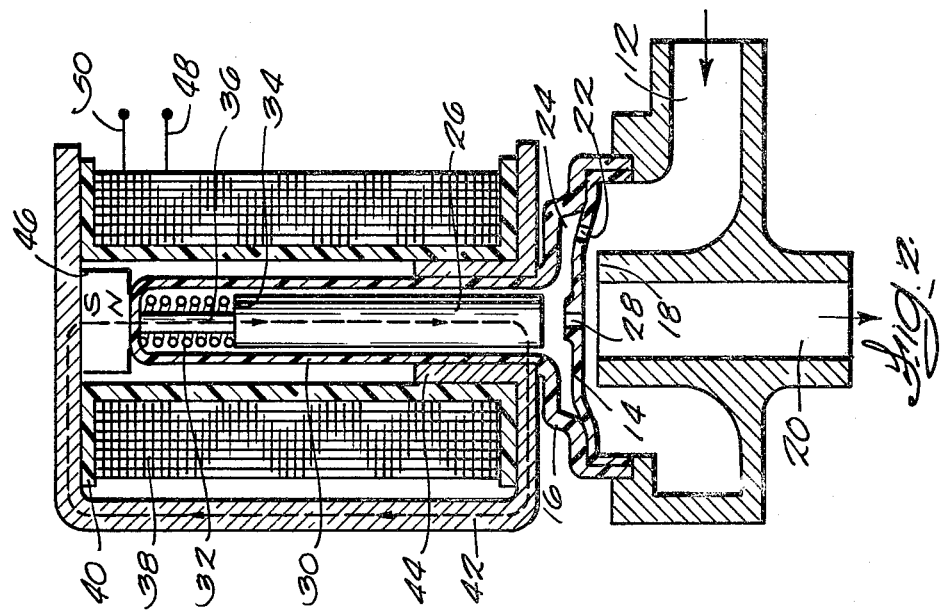
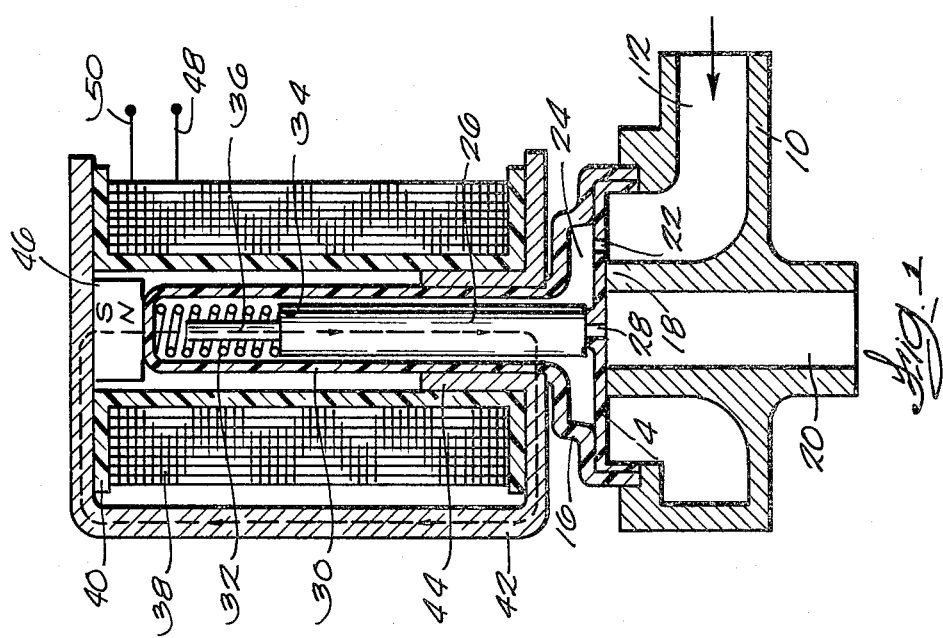

MAGNETIC LATCH VALVE

FIELD OF THE INVENTION

This invention relates to latching electromagnetic actuators and particularly latching electromagnetic valves.

BACKGROUND OF THE INVENTION

Conventional electromagnetic actuators require constant energization to hold the actuated device in its actuated position. This requires constant energy and, if AC voltage is applied can result in noise. To overcome this problem electromagnetically operated water valves have been made utilizing a permanent magnet outside the main coil flux path. When the coil is energized with DC voltage, the (actuator) plunger is drawn into the coil and into the magnetic field of the permanent magnet. When the direct current is cut off, the permanent magnet continues to hold the plunger in its actuated position against the bias of the return spring acting on the plunger. When the valve is to be closed, the polarity applied to the coil is reversed momentarily to oppose the field of the permanent magnet and allow the spring to push the plunger to its inactive position. The use of a permanent magnet outside of the main coil flux path means the leakage flux of the magnet is, in effect, not used and, therefore, a relatively large magnet is required. Furthermore, the external mounting of the magnet leads to attraction of foreign particles which can short circuit the magnet to decrease or eliminate the latching force and render the valve inoperative.

SUMMARY OF THE INVENTION

The object of this invention is to simplify and improve upon latching electromagnetic actuators. This is done by placing the permanent magnet in the coil flux path inside the coil and within the steel frame in direct alignment with the moving (actuator) plunger. With this design no foreign particles can reach the magnet to short circuit the magnet and the latching force of the magnet is not reduced by magnetic leakage. Further, the magnet can be small and is self-mounting since it is in direct contact with the magnetic frame. Since the permanent magnet is located inside the coil the magnet can be placed inside the coil in a non-magnetized condition to avoid picking up particles on the magnet during assembly. After assembly is completed the coil can be energized to magnetize the magnet. This is an important advantage.

BRIEF DESCRIPTION OF THE DRAWINGS

FIG. 1 shows the latching electromagnetic actuator in conjunction with the water valve and is a vertical section through the assembly.

FIG. 2 shows the water valve of FIG. 1 in the actuated and latched position with no voltage applied to the coil.

DETAILED DESCRIPTION OF THE DRAWINGS

The invention is shown in conjunction with a water valve having a body 10 provided with an inlet 12 leading to the underside of diaphragm 14 which is captured between the valve body 10 and the non-magnetic cover and plunger guide 16. Normally, as will appear more fully hereinafter, the diaphragm seats on valve seat 18 surrounding outlet 20. The diaphragm has a bleed hole 22 which permits inlet pressure to enter chamber 24. Magnetic plunger 26 is seated on the central orifice 28 of the diaphragm and the pressure above the diaphragm (in chamber 24) builds up to press the diaphragm against seat 18 and the valve is closed. When the plunger is moved from the orifice 28 the pressure above the diaphragm is relieved, that is, liquid flows out of chamber 24 faster than it will bleed through hole 22 and this results in the diaphragm lifting off seat 18 to allow flow from inlet 12 from outlet 20 as illustrated in FIG. 2. When the plunger is again seated on the central orifice 28, pressure will build up in chamber 24 through bleed hole 22 and seat the diaphragm on seat 18 to shut off flow. This is a simplified description of the water valve but is sufficient for understanding the present invention.

The non-magnetic cover and plunger guide includes a reduced diameter portion 30 serving to guide plunger 26 and, of course, prevent leakage from the chamber 24. The plunger is biased by compressed spring 32 towards the position in which it seats on the central orifice 28 of the diaphragm. The spring 32 seats against the shoulder 34 on the plunger and surrounds the reduced diameter projection or tip, 36 of the plunger.

A coil 38 wound on plastic bobbin 40 is mounted inside the magnetic steel frame 42 which includes the magnetic steel sleeve 44 (the frame will hereafter be referred to as 42 but it should be understood it includes the sleeve 44). Permanent magnet 46 is mounted inside the coil bobbin between the end of guide 30 and the frame. The permanent magnet is attracted to frame 42 and this results in it being securely mounted with no adhesives or other retaining means. With the permanent magnet polarity shown in FIG. 1 there will be a magnetic flux path as indicated by the dashed arrows. Thus the flux path goes down through the plunger and around the frame back to the south end of the magnet. In an unactuated position the magnetic flux is not strong enough to overcome the force of spring 32.

The coil 38 has leads terminating at 48, 50. When DC voltage is applied to terminals 48, 50 with the proper polarity the flux of the energized coil 38 will be in the same direction as the magnetic flux and the combined force is enough to lift the plunger 26 against the force of spring 32 to bring the plunger tip close to the N pole of the permanent magnet (there will still be a separation due to the non-magnetic plunger guide and whatever clearance there may be between the guide and the magnet). When the plunger has been lifted into the flux of the permanent magnet the magnet force is sufficient to retain the plunger in the actuated position as shown in FIG. 2 even after the coil is de-energized. The coil is energized only a few milliseconds to actuate the plunger and open the valve. Thus, the valve is actuated by a pulse of DC voltage. The valve will now remain open until reverse polarity DC voltage is applied momentarily to the coil so the coil flux opposes the magnet flux to reduce the holding force below the force of the spring bias at the moment the spring actuates the plunger to close the central orifice of the diaphragm and close the valve.

This valve is designed to be used with a battery power supply. It can be used with a rectified AC power supply but in that case the valve has an inherent problem in that a power failure when the valve is open would result in the valve remaining open and could cause disastrous flooding. Therefore, it is highly recommended that a valve of this type operated by rectified AC voltage utilize a circuit sensing power failure to apply a closing pulse to the coil either from a battery or a capacitor.

Placement of the permanent magnet within the inside diameter of the main coil and directly in the path of the main coil flux is believed to be new. The capability to operate on pulse energization saves energy. An economy offsetting the cost of the permanent magnet is realized in that the coil design requirements are not as stringent since there is no appreciable heat rise during the pulse energization. The magnet can be magnetized after assembly to avoid attracting foreign particles during assembly and after assembly is completed. The magnet is isolated from contamination by foreign particles tending to short circuit the magnet. There is no magnetic flux leakage path in the actuated position thereby permitting a small magnet to be utilized.

We claim:

1. A latching electromagnetic actuator comprising,
   a magnetic frame,
   a coil mounted within the frame,
   a permanent magnet mounted within the inside diameter of the coil in engagement with the frame and directly in the path of the coil flux,
   a magnetic plunger reciprocably mounted within the coil diameter and having a reduced diameter end facing the magnet,
   a nonmagnetic guide mounted inside said coil and having a closed end adjacent said magnet serving as an air gap spacing the reduced diameter end of the plunger from the magnet when the coil is energized to draw the plunger into the coil towards the magnet,
   a spring compressed between the closed end of the guide and the plunger to bias the plunger away from the permanent magnet,
   energization of the coil with DC voltage exerting sufficient magnetic attraction on said plunger to draw the plunger into the coil with the reduced diameter end close to but spaced from the permanent magnet by said guide to enable the permanent magnet to retain the plunger in the actuated position in opposition to said spring in absence of coil energization,
   application of DC voltage of opposite polarity to the coil being operative to develop sufficient coil flux opposing the magnetic flux of the magnet to permit the spring to move the plunger to its inactive position.

* * * * *